(12) United States Patent
Seibold et al.

(10) Patent No.: US 6,578,919 B2
(45) Date of Patent: Jun. 17, 2003

(54) VEHICLE SEAT

(75) Inventors: Kurt A. Seibold, South Lyon, MI (US); Travis W. Simmons, Plymouth, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/858,178

(22) Filed: May 15, 2001

(65) Prior Publication Data

US 2002/0171282 A1 Nov. 21, 2002

(51) Int. Cl.$^7$ .................................................. B60N 2/20
(52) U.S. Cl. ..................... 297/331; 297/334; 297/335; 297/340; 297/341; 297/378.1; 297/378.12; 296/65.09; 296/65.05
(58) Field of Search ........................... 297/452.18, 325, 297/331, 332, 334, 340, 341, 354.1, 378.1, 378.12, 378.14; 296/65.05, 65.09

(56) References Cited

U.S. PATENT DOCUMENTS

| | | | |
|---|---|---|---|
| 3,304,044 A | | 2/1967 | Campbell et al. |
| 3,711,153 A | * | 1/1973 | Cunningham ........ 297/378.1 X |
| 4,046,349 A | * | 9/1977 | MacAfee ................ 297/340 X |
| 4,364,602 A | | 12/1982 | Rigazio ...................... 297/334 |
| 4,461,511 A | * | 7/1984 | Berneking et al. .. 297/378.12 X |
| 4,475,769 A | * | 10/1984 | Crawford et al. ........... 297/331 |
| 4,636,003 A | | 1/1987 | Siebler ................... 297/340 X |
| 4,695,094 A | | 9/1987 | Siebler ....................... 297/331 |
| 4,736,985 A | | 4/1988 | Fourrey et al. ............. 297/331 |
| 4,805,953 A | * | 2/1989 | Yamauchi ............ 297/378.1 X |
| 4,957,321 A | * | 9/1990 | Martin et al. ........ 296/65.09 X |
| 5,195,795 A | * | 3/1993 | Cannera et al. ......... 297/331 X |
| 5,482,349 A | * | 1/1996 | Richter et al. .......... 297/341 X |
| 5,489,141 A | | 2/1996 | Strausbaugh et al. ....... 297/335 |
| 5,527,087 A | * | 6/1996 | Takeda et al. ...... 297/378.12 X |
| 5,570,931 A | * | 11/1996 | Kargillis et al. ........ 297/341 X |
| 5,588,707 A | | 12/1996 | Bolsworth et al. ...... 297/334 X |
| 5,795,023 A | * | 8/1998 | Kayumi ...................... 297/331 |
| 5,871,255 A | | 2/1999 | Harland et al. ..... 297/378.13 X |
| 6,000,742 A | | 12/1999 | Schaefer et al. ......... 296/65.09 |
| 6,012,755 A | * | 1/2000 | Hecht et al. ......... 296/65.09 X |
| 6,024,397 A | | 2/2000 | Scraver et al. ............. 297/335 |
| 6,070,934 A | * | 6/2000 | Schaefer et al. .... 297/378.12 X |
| 6,106,046 A | * | 8/2000 | Reichel ................... 296/65.09 |
| 6,113,191 A | * | 9/2000 | Seibold ................... 297/378.1 |
| 6,135,555 A | | 10/2000 | Liu et al. ............ 297/378.12 X |
| 6,189,964 B1 | | 2/2001 | Henshaw et al. ....... 297/335 X |
| 6,382,491 B1 | * | 5/2002 | Hauser et al. .......... 297/335 X |
| 6,398,291 B1 | * | 6/2002 | Reusswig et al. .... 296/65.05 X |

FOREIGN PATENT DOCUMENTS

| | | | | |
|---|---|---|---|---|
| DE | 297 00 293 U | | 2/1997 | |
| DE | 199 43 573 A | | 3/2001 | |
| DE | 297 240 441 U | | 4/2001 | |
| EP | 0 565 390 A | | 10/1993 | |
| FR | 39135 | * | 9/1931 | .................. 297/341 |
| JP | 56-82637 | * | 7/1981 | ............... 297/378.1 |

* cited by examiner

*Primary Examiner*—Rodney B. White
(74) *Attorney, Agent, or Firm*—Foley & Lardner

(57) ABSTRACT

A vehicle seat for a vehicle having a floor has an occupant use position, a stowed position, and an ingress/egress position. The seat includes a riser pivotally coupled to the vehicle floor, a seatback pivotally connected to the riser, and a cushion pivotally coupled to the seatback. The seatback remains fixed with respect to the riser when the seat is moved from the occupant use position to the ingress/egress position and the riser remains fixed with respect to the vehicle floor when the seat is moved from the occupant use position to the stowed position.

21 Claims, 6 Drawing Sheets

VEHICLE SEAT

FIELD OF THE INVENTION

The present specification relates to vehicle seats. More specifically, the present specification relates to a four-bar vehicle seat having both a stow and an ingress/egress function.

BACKGROUND OF THE INVENTION

Vehicle seats, particularly vehicle seats used in the second row of vehicles having a third row of seats, such as sport utility vehicles and vans, are typically designed to fold, slide, or pivot forward to permit easier entry into the third row of seats. Further, it is also desirable for vehicle seats to have a stow position, in which the seatback folds forward creating a larger space in the vehicle for storage of bulky cargo.

Conventional vehicle seats are typically designed to permit easier ingress and egress to the next row in one of two ways. First, the seat can be mounted on tracks and the seatback pivotally mounted to the seat cushion such that to permit ingress and egress, the seatback is folded forward and the seat moved to a forward position on the tracks to create more room. This type of seat is typically called a dump style seat. Second, conventional seats can have rear legs that are releasably mounted to the floor of the vehicle such that more room for ingress and egress is created by releasing the rear legs and pivoting the entire seat forward about pivotally mounted front legs. Seats having this type of mechanism are conventionally called fold and tumble seats.

The conventional designs used for the ingress and egress function described above have the following disadvantages. If the seat is mounted on tracks and slides forward on those tracks, the rear portion of the tracks remain on the vehicle floor, creating a tripping hazard for occupants moving into and out of the vehicle, as well as being aesthetically unpleasing. The same disadvantages result from fold and tumble style seats with releasable rear legs because the floor mount remains in place, interfering with occupants and generally being unsightly. Further, both the tracks and the rear leg and associated floor mount interfere with the leg room of passengers seated in the next row when the seat is in the driving position. Further still, seats having a releasable rear leg typically require a mechanism to automatically retract the leg as the seat is tumbled forward such that passengers are not harmed or interfered with when entering or exiting the vehicle. The equipment necessary to automatically retract the rear leg into the frame of the seat adds manufacturing costs to the vehicle seat. Further still, moving the conventional seat out of the way to permit ingress and egress can require two steps, the first involving folding the seatback forward and the second involving sliding the seat forward or tumbling the seat after releasing the rear leg. Yet further still, the track mounted dump style seat may not create a sufficiently large opening for ingress and egress because the rear portion of the seat cushion remains level with the floor of the vehicle after sliding forward rather than lifting up and out of the way.

Conventional seats can also be designed to permit a stowed or utility position. The conventional mechanisms used to place a vehicle seat into a stowed position include a pivot between the seatback and cushion allowing the seatback to be folded down to an essentially flat position on the cushion to create more cargo space. Another conventional method involves a releasable rear leg as described above permitting the entire seat to be tumbled forward into a recess or cavity in the floor of the vehicle. A third conventional style includes the use of a four-bar seat mechanism to pivot the entire seat forward into a cavity in the vehicle after first folding the seatback down onto the seat cushion.

The conventional mechanisms used to create a stowed position have the following disadvantages. If the seatback is designed to fold onto the cushion for storage but the cushion itself does not shift in some manner, it is difficult to design a seatback that will fold to an essentially horizontal position because of the upholstery and padding on the seatback and cushion. In order to avoid this problem, the seatback can be designed with substantially less upholstery and padding, sacrificing occupant comfort. Further, as described above, seats that have a releasable rear leg are more costly and result in the floor mount left behind after releasing the rear leg thus interfering with occupants and cargo storage in the vehicle. Further, four-bar type seats that kneel into a stowed position serve the utilitarian function of having a stowed position but may not include the second function of moving into a position to permit occupant ingress and egress from the vehicle.

Accordingly, there is a need for a vehicle seat that has both a stowed position and a position to permit occupant ingress and egress that is cost effective, does not leave unsightly and hazardous hardware on the floor of the vehicle when in the stowed or ingress/egress positions, that does not have tracks or a rear leg that interfere with the leg room of occupants in the next row, that creates enough room to permit easy ingress and egress from the vehicle, and that does not require multiple steps to place the seat into the ingress/egress position or the stowed position.

The teachings hereinbelow extend to those embodiments that fall within the scope of the appended claims, regardless of whether they accomplish one or more of the above-identified needs.

SUMMARY OF THE INVENTION

An exemplary embodiment relates to a vehicle seat for a vehicle having a floor. The seat includes a riser pivotally connected to the vehicle floor, a seatback pivotally connected to the riser, an upper member pivotally connected to the seatback, and a front leg pivotally connected to the upper member and the vehicle floor. The upper member is not directly connected to the riser.

Another exemplary embodiment relates to a vehicle seat coupled to a vehicle floor and having a front leg, a riser, an upper member, and a seatback. The vehicle seat includes a first pivot connecting the upper member and the front leg, a second pivot connecting the front leg and the vehicle floor, a third pivot connecting the vehicle floor and the riser, a fourth pivot connecting the riser and the seatback, and a fifth pivot connecting the seatback and the upper member.

Further, an exemplary embodiment relates to a vehicle seat coupled to a vehicle floor and having an occupant use position, a stowed position, and an ingress/egress position. The vehicle seat includes a riser pivotally coupled to the vehicle floor, a seatback pivotally coupled to the riser, and a cushion pivotally coupled to the seatback. The seatback remains fixed with respect to the riser when the seat is moved from the occupant use position to the ingress/egress position. Further, the riser remains fixed with respect to the vehicle floor when the seat is moved from the occupant use position to the stowed position.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF EXEMPLARY EMBODIMENTS

Figure 1:
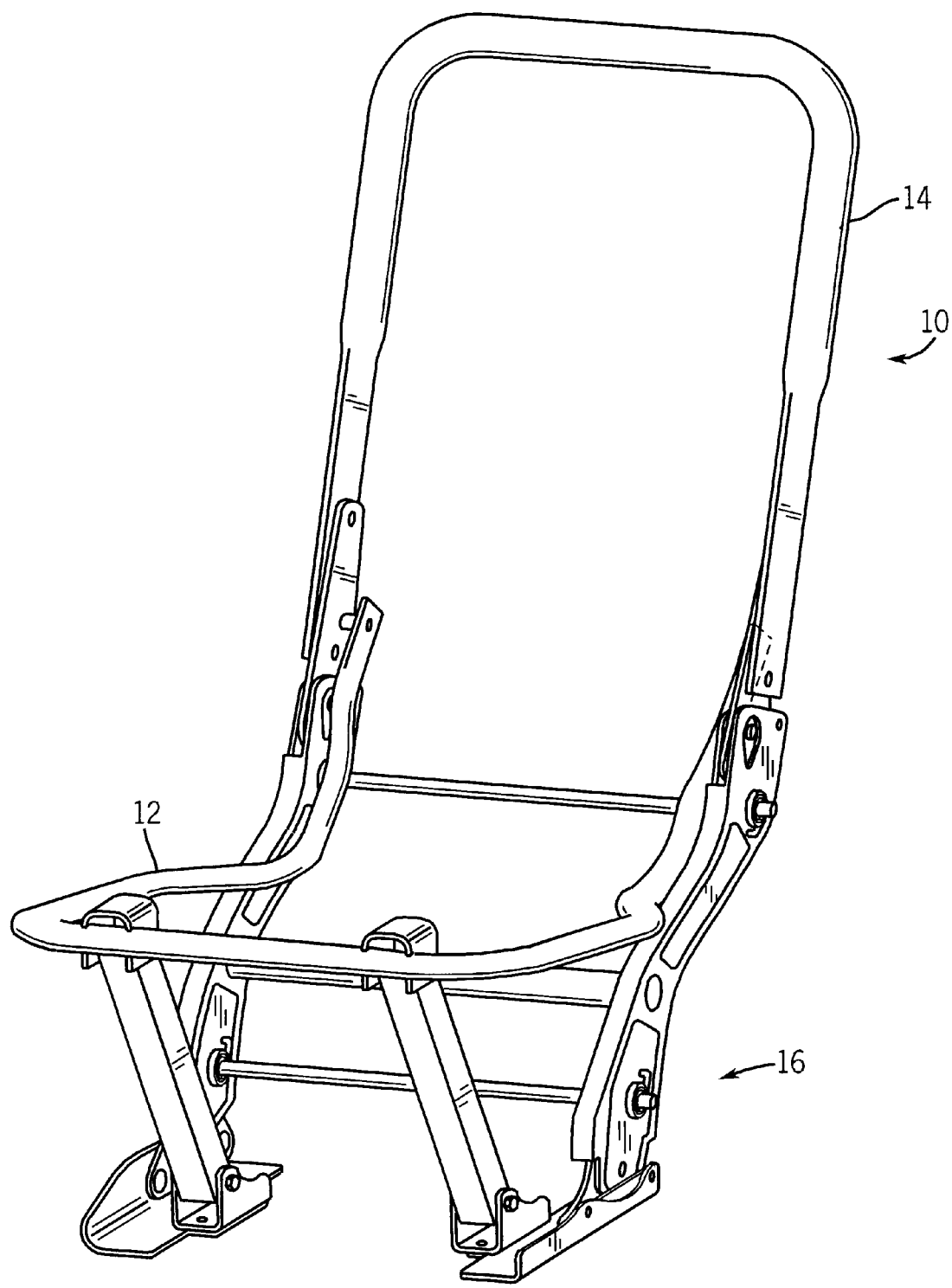
FIG. 1 is an isometric view of a vehicle seat in the occupant use position.

Referring to FIG. 1, a structural frame of a vehicle seat 10 includes a cushion frame 12 and a seatback frame 14. Supporting the cushion frame 12 and seatback 14 is a support structure shown as four-bar linkage 16. Two four-bar linkages 16 can be used to support the vehicle seat 10.

Figure 2:
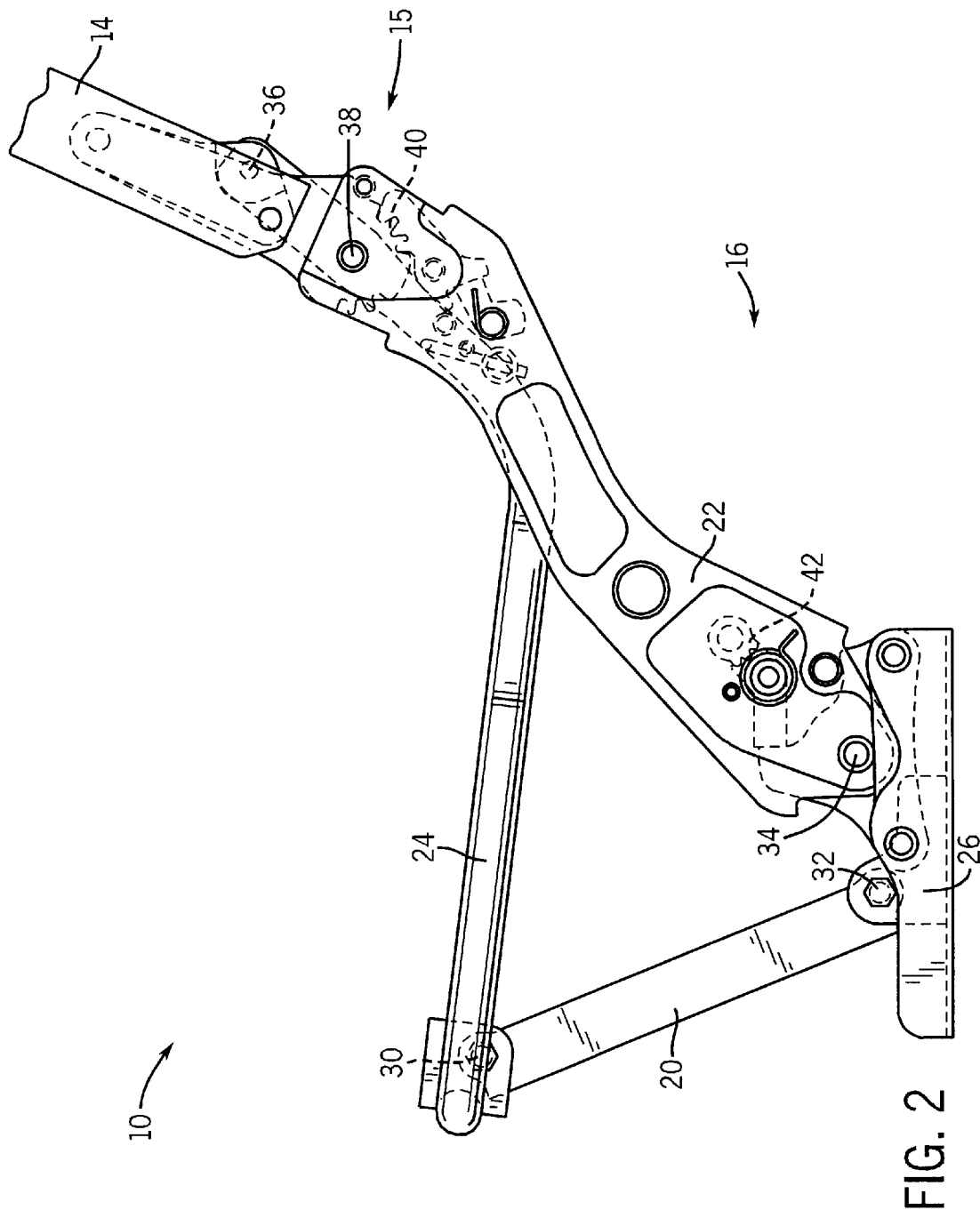
FIG. 2 is a side view of a vehicle seat in the occupant use position.

Referring to FIG. 2, four-bar linkage 16 includes a front member, shown as front leg 20, a rear member 15, an upper member 24, and a lower member, shown as floor 26.

Rear member 15 of four-bar linkage 16 includes riser 22 and seatback 14. Seatback 14 can be pivotally fixed with respect to riser 22 such that the combination functions as rear member 15. The combination of riser 22 and seatback 14 to create rear member 15 works in conjunction with the motion of four-bar linkage 16 during motions wherein seat 10 is pivoted forward while riser 22 and seatback 14 are fixed with respect to one another.

To functionally create four-bar linkage 16, upper member 24 and front leg 20 are pivotally coupled at front upper pivot 30, front leg 20 and floor 26 are pivotally coupled at front lower pivot 32, floor 26 and rear member 15 (via riser 22) are pivotally coupled at rear lower pivot 34, and rear member 15 (via seatback 14) and upper member 24 are pivotally coupled at rear upper pivot 36.

Further referring to FIG. 2, riser 22 is pivotally coupled to seatback 14 at seatback pivot 38. Accordingly, seatback 14 is pivotally coupled to both upper member 24 and riser 22, but riser 22 is not coupled to upper member 24.

Further referring to FIG. 2, seatback 14 and riser 22 are pivotally fixed to one another by a latch, shown as stow latch 40. Further, riser 22 is pivotally fixed with respect to floor 26 by latch, shown as ingress/egress mechanism 42. When released, stow latch 40 permits pivotal movement between seatback 14 and riser 22. When released, ingress/egress mechanism 42 permits pivotal movement between riser 22 and floor 26 at rear lower pivot 34.

Riser 22 is structured such that rear lower pivot 34 is disposed proximate front lower pivot 32, relative to the lateral distance between front upper pivot 30 and rear upper pivot 36. To accomplish this, riser 22 is curved and is substantially longer than front leg 20.

Figure 3:
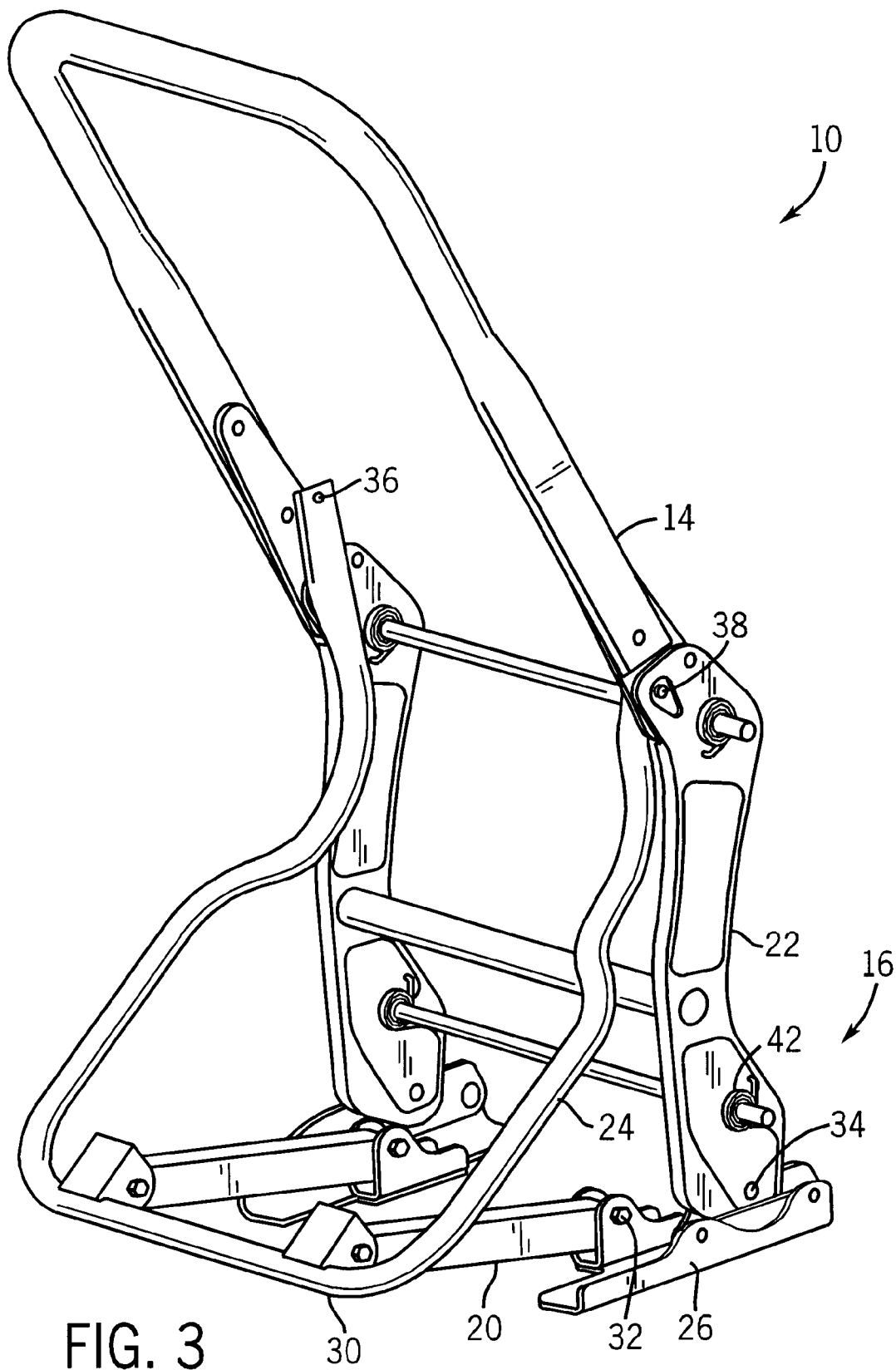
FIG. 3 is an isometric view of a vehicle seat in the ingress/egress position.
Figure 4:
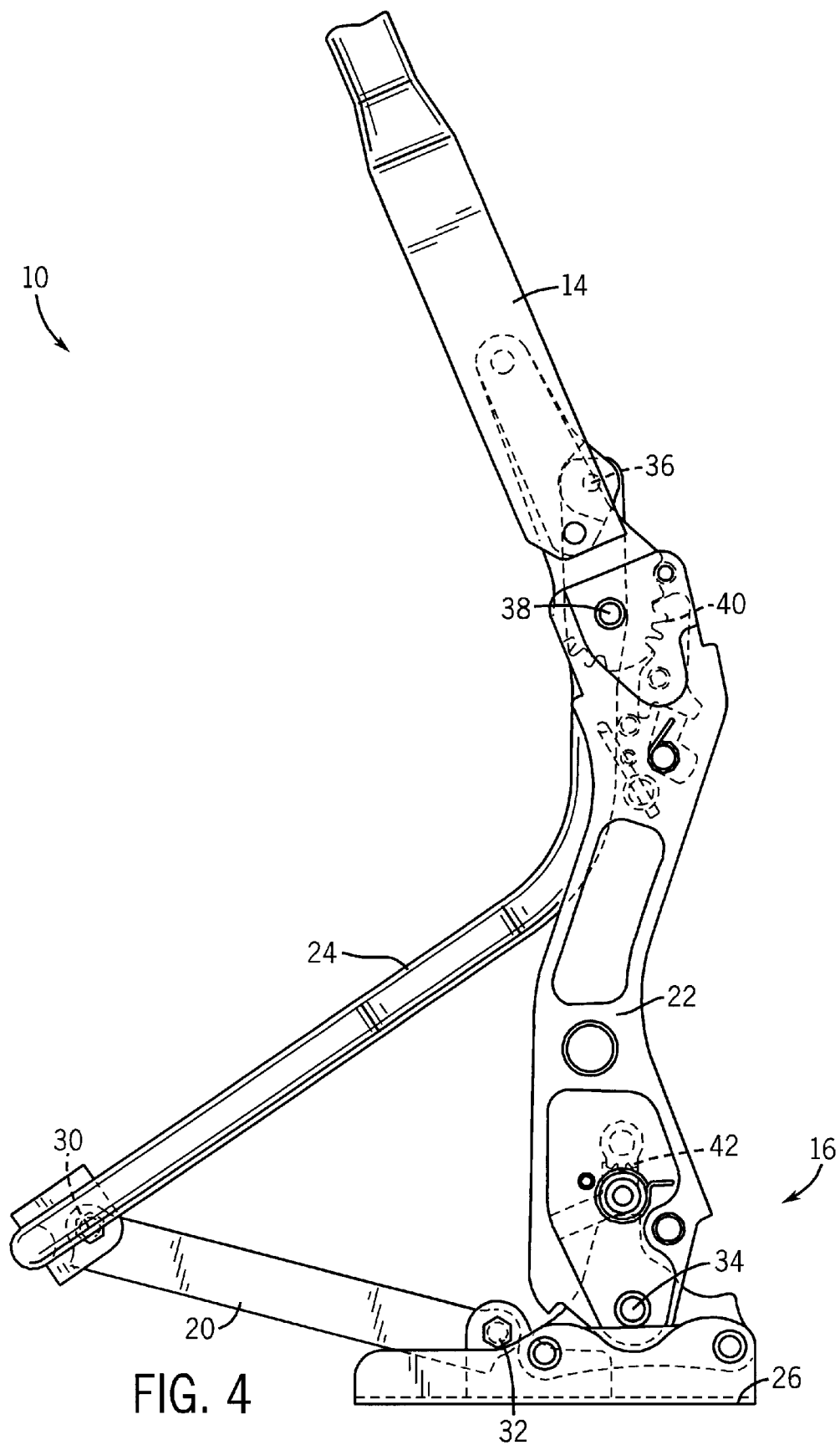
FIG. 4 is a side view of a vehicle seat in the ingress/egress position.

Referring to FIG. 3 and FIG. 4, seat 10 may be pivoted forward to permit easy ingress and egress to the next row of seats. To effectuate the ingress/egress position, ingress/egress mechanism 42 is released to permit riser 22 to pivot forward (to the left in the orientation depicted in FIGS. 1–6). Seatback 14 maintains its original position with respect to riser 22 as seat 10 is pivoted forward in the vehicle. As seat 10 is moved forward, upper member 24, front leg 20, and riser 22 move forward, pivoting with respect to one another and the floor 26. The degree of movement of seat 10 permitted by four-bar linkage 16 may be limited by the degree of downward motion of front leg 20 permitted by the vehicle structure or by a limiting mechanism in riser 22.

Figure 5:
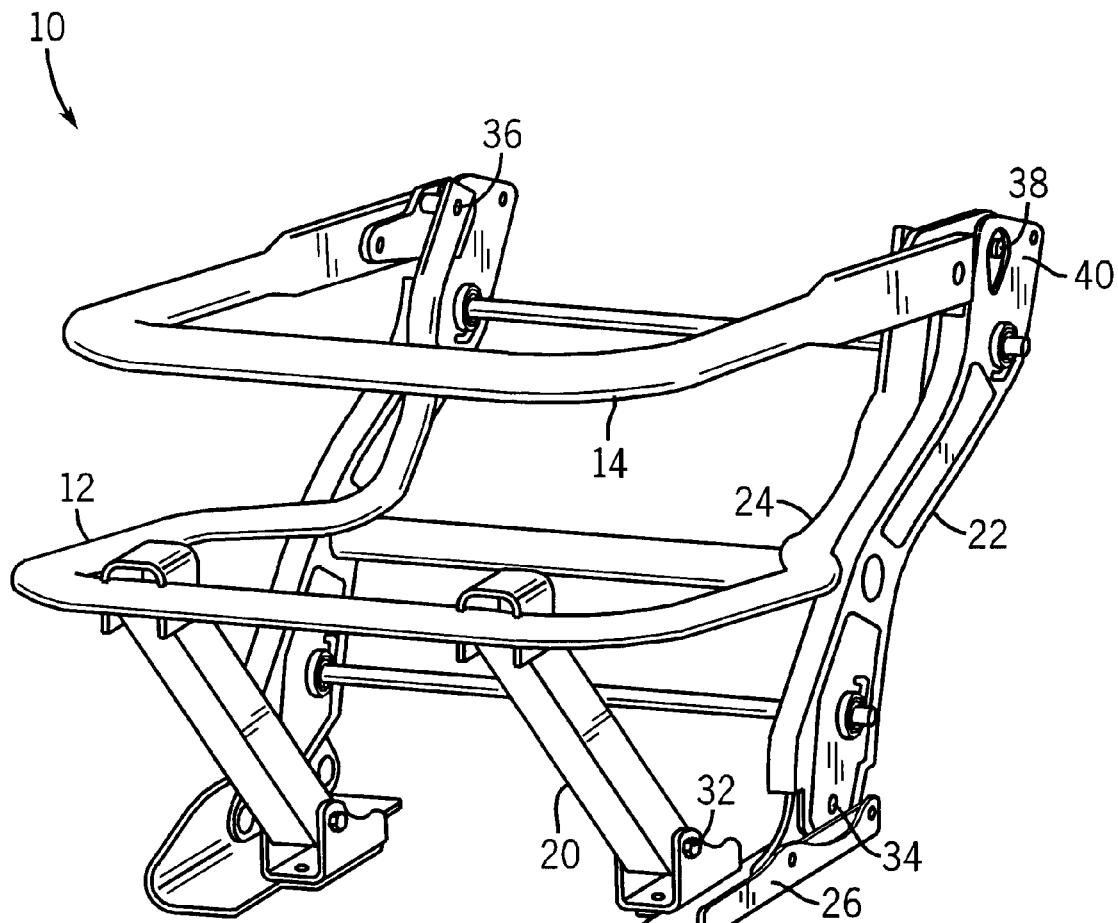
FIG. 5 is an isometric view of a vehicle seat in the stowed position.
Figure 6:
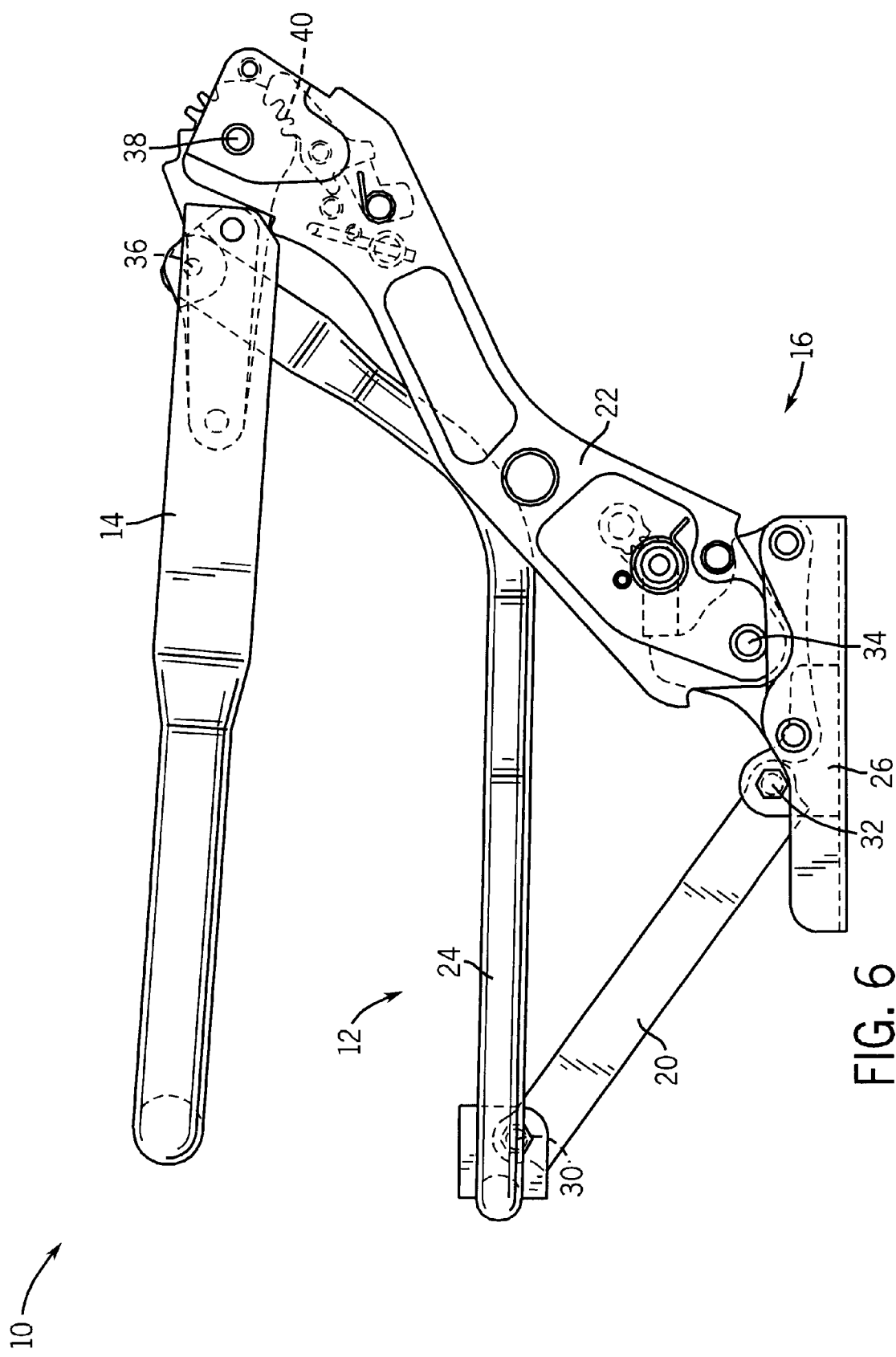
FIG. 6 is a side view of a vehicle seat in the stowed position.

Referring to FIG. 5 and FIG. 6, seat 10 may also be placed into a stowed position to permit more room in the vehicle for cargo storage. To effectuate the stowed position, seatback 14 is pivoted forward with respect to riser 22. To permit seatback 14 to pivot with respect to riser 22 about seatback pivot 38, stow latch 40 is first released. As seatback 14 folds forward, riser 22 and floor 26 remain fixed. However, because upper member 24 is coupled to seatback 14 at rear upper pivot 36, seatback 14 drives upper member 24 forward, which in turn causes articulation of front leg 20 in a counterclockwise direction (when viewed in the orientation of FIG. 6) about front lower pivot 32. Accordingly, front upper pivot 30 moves forward (to the left when viewed in the orientation of FIG. 6) and downward as seatback 14 is pivoted forward in the vehicle, resulting in a lower final position of cushion frame 12 in the stowed position (see FIG. 5) as compared to the occupant use position (see FIG. 1). The movement of upper member 24 during the rotation of seatback 14 permits seatback 14 to fold further than would be possible if seatback 14 merely pivoted with respect to riser 22 and did not simultaneously force forward and downward motion of upper member 24.

Referring again to FIG. 1 and FIG. 2, in the occupant use position, seat 10 permits increased leg room for occupants sitting behind seat 10 because riser 22 is structured with rear lower pivot 34 disposed proximate front lower pivot 34. This structure can be contrasted with conventional vehicle seats that have a rear lower leg that drops vertically from the rear of cushion frame 12, or that have rails disposed on floor 26, interfering with the leg room of third row seat occupants.

Vehicle seat 10 described above and shown in FIGS. 1–6 may be used as a second row seat in a vehicle having three rows of seating such as large sport utility vehicles or vans. In another exemplary embodiment, seat 10 may be used as a front row seat.

Referring again to FIG. 3 and FIG. 4, seat 10 may be placed into an ingress/egress position without releasing riser 22 from floor 26. Further, because rear lower pivot 34 is disposed proximate front lower pivot 32, sufficient ingress/egress space is created without requiring seat 10 to be mounted on tracks as is the case with conventional seats. Furthermore, the absence of tracks or a releasable rear leg floor mount result in a clear entry or exit pathway without equipment on the floor of the vehicle obstructing entering or exiting passengers. Further still, placing seats 10 into the ingress/egress position can be done in one motion by releasing ingress/egress mechanism 42, thereby permitting seat 10 to be pivoted forward using four-bar linkage 16.

Referring again to FIG. 5 and FIG. 6, seat 10 can be placed in the stowed position utilizing one action, by releasing stow latch 40, thereby permitting seatback 14 to be pivoted forward onto cushion frame 12. Because seatback 14 drives upper member 24 and front leg 20 forward and downward as seatback 14 is pivoted into the stowed position, both seatback 14 and cushion frame 12 can be thicker without sacrificing the final horizontal position of seatback 14. Accordingly, seat 10 can have more upholstery and padding, providing greater support and comfort, than conventional seats that do not have the mechanism described herein.

In contrast to conventional seat mechanisms, vehicle seat 10, because of four-bar linkage 16 and additional seatback pivot 38 support both an ingress/egress position and a stowed utilitarian position.

While the detailed drawings and specific examples given describe exemplary embodiments, they serve the purpose of illustration only. The configurations shown and described may differ depending on the characteristics of the vehicle in which seat 10 is used. The seat shown and described is not limited to the precise details disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A vehicle seat for a vehicle having a floor, the vehicle seat having an occupant use position and an ingress/egress position and comprising:
    a riser adapted to be pivotally connected to the vehicle floor;
    a seatback pivotally connected to the riser;
    an upper member pivotally connected to the seatback;
    a front leg pivotally connected to the upper member and adapted for pivotal connection to the vehicle floor; and
    an ingress/egress mechanism configured to secure the riser and the vehicle floor with respect to one another, wherein the seat can be placed into the ingress/egress position by releasing the ingress/egress mechanism and pivoting the seat in a forward direction;
    wherein the upper member is not connected directly to the riser and wherein the seatback remains fixed with respect to the riser when the seat is moved from the occupant use position to the ingress/egress position.

2. The vehicle seat of claim 1, wherein the seat has a stowed position, and wherein the riser remains stationary when the seat is moved from the occupant use position to the stowed position.

3. A vehicle seat for a vehicle having a floor, the vehicle seat comprising:
    a riser adapted to be pivotally coupled to the vehicle floor;
    a seatback pivotally connected to the riser;
    an upper member pivotally connected to the seatback, wherein the upper member is not connected directly to the riser;
    a front leg pivotally connected to the upper member and adapted for pivotal connection to the vehicle floor; and
    a stow latch configured to secure the seatback and the riser with respect to one another.

4. The vehicle seat of claim 3, wherein the seat can be placed into the stowed position by releasing the stow latch and pivoting the seatback in a forward direction onto the upper member.

5. The vehicle seat of claim 1, wherein the seat is adapted to be a second row seat in a vehicle having more than two rows of seats.

6. A vehicle seat for a vehicle, the vehicle seat coupled to a vehicle floor and having a front leg, a riser, an upper member, and a seatback, comprising:
    a first pivot connecting the upper member and the front leg;
    a second pivot adapted to connect the front leg and the vehicle floor;
    a third pivot adapted to connect the vehicle floor and the riser;
    a fourth pivot connecting the riser and the seatback;
    a fifth pivot connecting the seatback and the upper member; and
    an ingress/egress mechanism configured to secure the riser and the vehicle floor with respect to one another, wherein the seat can be placed into an ingress/egress position by releasing the ingress/egress mechanism and pivoting the seat in a forward direction;
    wherein the seat has an occupant use position and a stowed position, and wherein the riser remains stationary when the seat is moved from the occupant use position to the stowed position.

7. The vehicle seat of claim 6, wherein the fifth pivot is disposed above the fourth pivot, thereby driving the upper member in a forward direction when the seatback is moved from the occupant use position to the stowed position.

8. The vehicle seat of claim 6, wherein the first pivot is disposed forward of the second pivot, whereby the first pivot moves downward when the seatback is moved from the occupant use position to the stowed position.

9. The vehicle seat of claim 8, wherein the seatback is horizontally disposed when the seat is in the stowed position.

10. The vehicle seat of claim 6, wherein the seat has an occupant use position and an ingress/egress position, wherein the seatback remains fixed with respect to the riser when the seat is moved from the occupant use position to the ingress/egress position.

11. A vehicle seat for a vehicle, the vehicle seat coupled to a vehicle floor and having a front leg, a riser, an upper member, and a seatback, comprising:
    a first pivot connecting the upper member and the front leg;
    a second pivot connecting the front leg and the vehicle floor;
    a third pivot connecting the vehicle floor and the riser;
    a fourth pivot connecting the riser and the seatback;
    a fifth pivot connecting the seatback and the upper member; and
    a stow latch configured to secure the seatback and the riser with respect to one another.

12. The vehicle seat of claim 11, wherein the seat can be placed into a stowed position by releasing the stow latch and pivoting the seatback in a forward direction onto the upper member.

13. The vehicle seat of claim 6, wherein the riser is tapered in a rearward direction such that the distance between the second pivot and the third pivot is substantially less than the distance between the first pivot and the fifth pivot.

14. The vehicle seat of claim 6, wherein the seat is adapted to be a second row seat in a vehicle having more than two rows of seats.

15. A vehicle seat coupled to a vehicle floor and having an occupant use position, a stowed position, and an ingress/egress position, comprising:
    a riser adapted to be pivotally coupled to the vehicle floor;
    a seatback pivotally coupled to the riser;
    a cushion pivotally coupled to the seatback; and
    an ingress/egress mechanism configured to secure the riser and the vehicle floor with respect to one another, wherein the seat can be placed into the ingress/egress position by releasing the ingress/egress mechanism and pivoting the seat in a forward direction;
    wherein the seatback remains fixed with respect to the riser when the seat is moved from the occupant use position to the ingress/egress position and further wherein the riser remains stationary when the seat is moved from the occupant use position to the stowed position.

16. The vehicle seat of claim 15, wherein the riser remains coupled to the floor when in the occupant use, stowed, and ingress/egress positions.

17. The vehicle seat of claim 15, wherein the seatback drives the upper member in a forward direction when the seatback is moved from the occupant use position to the stowed position.

18. A vehicle seat coupled to a vehicle floor and having an occupant use position, a stowed position, and an ingress/egress position, comprising:

a riser adapted to be pivotally coupled to the vehicle floor;

a seatback pivotally coupled to the riser;

a cushion pivotally coupled to the seatback; and a stow latch configured to secure the seatback and the riser with respect to one another;

wherein the seatback remains fixed with respect to the riser when the seat is moved from the occupant use position to the ingress/egress position and further wherein the riser remains stationary when the seat is moved from the occupant use position to the stowed position.

19. The vehicle seat of claim 18, wherein the seat can be placed into the stowed position by releasing the stow latch and pivoting the seatback in a forward direction onto the cushion.

20. The vehicle seat of claim 15, wherein the seatback is horizontally disposed when the seat is in the stowed position.

21. The vehicle seat of claim 15, wherein the riser is adapted to be coupled to the vehicle floor at a pivot position disposed forward of the pivot position at which the riser is coupled to the seatback.

* * * * *